INVENTOR.
MARVIN H. GROVE

INVENTOR.
MARVIN H. GROVE

United States Patent Office 3,455,535
Patented July 15, 1969

3,455,535
GATE VALVE
Marvin H. Grove, Houston, Tex., assignor to M & J Valve Company, Houston, Tex., a corporation of Delaware
Continuation-in-part of application Ser. No. 635,834, May 3, 1967. This application Dec. 22, 1967, Ser. No. 692,955
Int. Cl. F16k 3/00
U.S. Cl. 251—326                                    2 Claims

ABSTRACT OF THE DISCLOSURE

A gate valve of the fabricated type in which the operating rod is connected to the gate by interengaging slotted head and T-bar members. By unbolting the bonnet plate the operating head can be disengaged from the gate by movement of the plate and rod in the plane of the gate and laterally of the longitudinal center line of the valve.

Cross-reference to related application

This application is a continuation-in-part of my copending application S.N. 635,834 filed May 3, 1967 for "Valve Equipment with Hydraulic Operator."

Background of the invention

Fabricated gate valves commonly have fabricated bodies made by welding together structural steel shapes such as plates and the like. The end walls of the body are flat and rectangular and have aligned openings forming flow passages. The gate is flat or slablike, and may be of the through-port type with a port which registers with the openings in the body for full open position of the valve, or it may be a shorter gate without such a port. The lower end of the valve body is closed as by a welded-on bottom plate, and at the upper end of the body there is a welded-on flange to which a bonnet plate is bolted. The operating rod extends through the bonnet plate and is connected to the corresponding end of the gate.

In Patent 3,279,747 there is shown a gate valve of the above type with a special arrangement to facilitate detachment of the operating rod from the gate. More specifically, the upper end of the gate is provided with a keyhole shaped opening, and the inner end of the operating rod is attached to a head which fits within the keyhole shaped opening. When the gate is moved to its completely raised or full open position, the bonnet plate can be unbolted from the flange and thereafter the bonnet plate and the operating rod moved in a direction laterally of the plate of the gate to disengage the operating rod. The particular construction shown in Patent 3,279,747 employs a turret-like bonnet extension into which the upper end of the gate is raised before the operating rod is detached. After detachment the uppermost extremity of the gate is located above the plane of the flange. Also the arrangement shown in Patent 3,279,737 requires that the gate be in its raised or open position before the operating rod can be detached. This is because the spacing between the end walls is such that it does not permit this detachment when the gate is in an intermediate or closed position.

Summary of the invention and objects

The invention relates generally to valves of the fabricated gate type, and particularly to valves which may be made in the larger sizes and which are suitable for pipe line service.

An object of the invention is to provide a gate valve which is an improvement over gate valve constructions of the type shown in Patent 3,279,747.

Another object of the invention is to provide an improved gate valve of the fabricated type having novel means for engaging and disengaging the operating rod with respect to the gate.

Another object of the invention is to provide a gate valve of the above character in which the operating rod can be detached from the gate when the gate is in open or closed or intermediate positions.

Additional objects and features of the invention will appear from the following description in which the preferred embodiment has been shown in detail in conjunction with the accompanying drawing.

Briefly the present invention is a gate valve having a box-like valve body made of rectangular end walls having their side edges secured to side walls and with the end walls having aligned openings forming flow passages. A flat gate is disposed within the body and is movable between open and closed operating positions relative to the flow passages. A closure is provided for the bottom end of the body. A flange is welded on the upper end of the body and a bonnet plate is bolted to the flange. An operating rod extends through the bonnet plate and means is provided for detachably connecting the inner end of the operating rod to the gate. This means consists of interengaging T-bar and slotted head members secured to the operating rod and to the adjacent end of the gate. These members are engaged and disengaged by relative movement between the members in the general plane of the gate, whereby when the bonnet plate is unbolted from the flange movement of the operating rod and bonnet plate in the direction of the plane of the gate and laterally of the longitudinal center line of the valve serves to disengage the rod from the gate.

Description of the preferred embodiment

Figure 1:
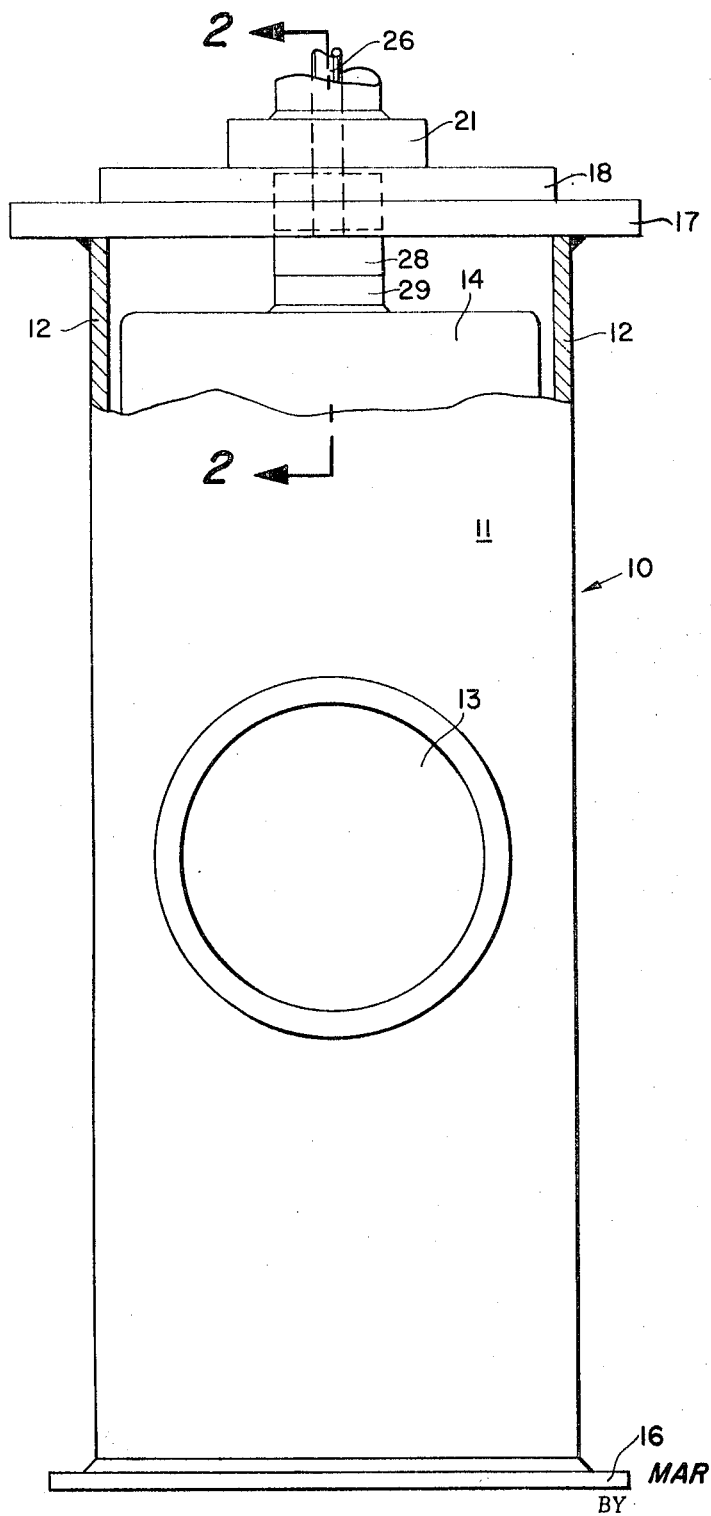
FIGURE 1 is an end view illustrating a gate valve incorporating the present invention.

The gate valve illustrated in the drawing consists of a box-like fabricated body 10 made of rectangular end walls 11 secured at their side edges to side walls 12. The end walls have aligned openings 13 forming flow passages. The gate 14 within the body is flat, and in this instance moves vertically between its upper open and lower closed operating positions. It is assumed in this instance that the gate is provided with a port that registers with the openings 13 for full open position. Such a valve is commonly referred to as one of the through-port type.

The lower end of the valve body is closed by the bottom plate 16, and the upper end is provided with a welded-on flange 17. A bonnet plate 18 is clamped upon the flange 17 by the bolts or capscrews 19. Another mounting member 21 is shown attached to the plate 18 by bolts or capscrews 22, and serves to mount suitable operating means, such as one of the handwheel, or power operated types. Leakage between the flange 17 and plate 18, and between plate 18 and member 21, can be prevented by suitable means such as the seal rings 24 and 25 of the resilient O-ring type.

An operating rod 26 extends through the mounting member 21 and the bonnet plate 18, and has its inner end detachably secured to the corresponding end of the gate 14. Suitable means is provided to prevent leakage about the operating rod, such as the seal 27 of the resilient O-ring type.

The means shown for detachably connecting the operating rod 26 with the gate 14 consists of interengaging members 28 and 29. Member 28 is in the form of a block or head which is secured to the operating rod 26 as by means of a threaded engagement 30. A lock pin 31 is shown inserted through the head and through the adjacent threaded portion of the rod 26 to lock these parts against relative rotation. The head is provided with a keyhole shaped slot 32 which normally accommodates the T-bar 29.

It will be noted that with the valve in vertical position as shown in FIGURE 1, the slot 32 and the T-bar 29 extend horizontally and in the plane of the gate 14. The clearances are such that the head 28 can be readily disengaged from the T-bar 29. Preferably the T-bar is made separate from the gate and it is attached to the gate by weld connection 33.

As previously mentioned, the mounting member 21 can serve to mount any one of several types of valve operators. The pipe 34 which is secured to mounting member 21 may represent the yoke of a handwheel type of operator. It may also represent a cylinder of a piston-cylinder type of hydraulic operator.

The sealing assemblies employed have not been illustrated but may for example be assemblies as shown in Patent 3,305,213 or 3,339,886. Such sealing assemblies are carried by the end walls and have seal rings of resilient material that are spring pressed toward the gate.

Figure 2:
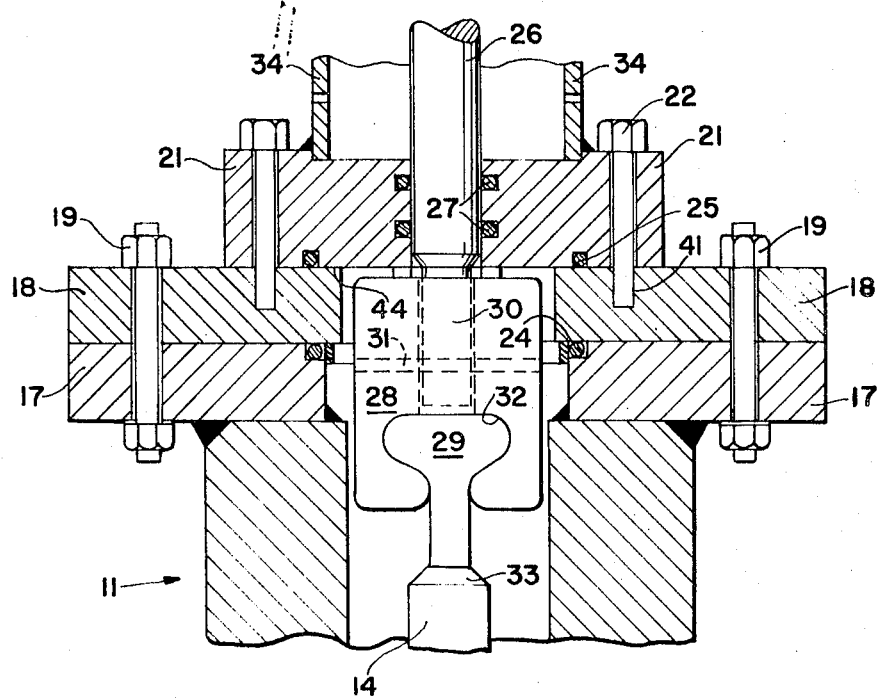
FIGURE 2 is a cross-sectional detail taken along the line 2—2 of FIGURE 1.
Figure 3:
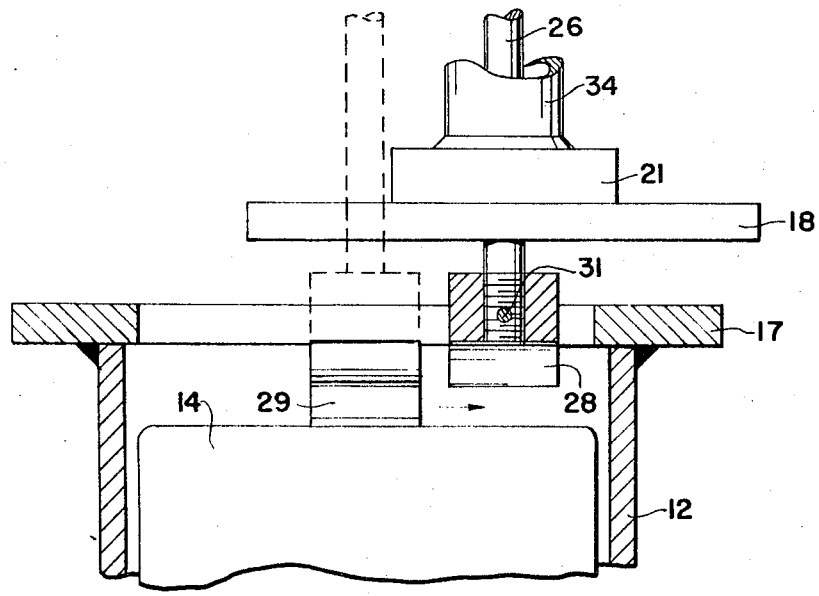
FIGURE 3 is a detail illustrating how the operating stem is detached.

The valve described above operates as follows. The engagement of the slotted head 28 with the T-bar 29 provides an effective articulated connection between the operating rod 26 and the gate 14. If it becomes necessary to repair the valve in the field, as for example to replace the sealing assemblies, the gate is moved to its uppermost position, the bolts 19 are removed, and then the bonnet plate 18, together with the operating rod 26 and other parts associated with the same, are moved toward one side of the body in the manner illustrated in FIGURE 3. This serves to detach the slotted head 28 from the T-bar 29, thus permitting all of the parts above the flange 17 to be removed. By reversing this procedure, the operating rod can be connected to the gate and all parts returned to the normal position illustrated in FIGURES 1 and 2.

Since movement of the head 28 to detach it or couple it with the T-bar 29 is in the direction of the plane of the gate, the gate may be in an intermediate or its lowermost position when the operating rod is detached or applied. Also the T-bar may have its upper end at a level below the top surface of the flange 17 when the gate is in its uppermost position.

In a number of instances it is desirable to install gate valves with the axes of the flow passages vertical and with the gate extending horizontally. My invention lends itself to such installations because the engagement between the slotted head 28 and the T-bar 29 adequately supports one end of the gate when in horizontal position.

I claim:

1. In a gate valve, a box-like valve body comprising rectangular end walls having their side edges secured to side walls, the end walls having aligned openings forming flow passages, a flat gate within the body and movable between open and closed operating positions relative to the flow passages, means forming a closure for the bottom end of the body, a flange welded on the upper end of the body, a bonnet plate bolted to the flange, an operating rod extending through the bonnet plate, and means for detachably connecting the end of the operating rod to the gate, said means comprising interengaging T-bar and head members secured to the operating rod and to the adjacent end of the gate, said members being engaged and disengaged by relative movement between the same in the general plane of the gate, whereby when the bonnet plate is unbolted from the flange movement of the operating rod and bonnet plate in the direction of the plane of the gate and laterally of the longitudinal center line of the valve serves to disengage the operating rod from the gate.

2. A valve as in claim 1 in which the T-bar extends laterally of the center line of the gate and is welded to the adjacent end of the gate, the slotted head being secured to the operating rod and having a keyhole shaped opening to accommodate the T-bar.

References Cited
UNITED STATES PATENTS 3,032,310    5/1962    Hansen _____ 251—328 X ARNOLD ROSENTHAL, Primary Examiner